(12) United States Patent
Wang et al.

(10) Patent No.: US 11,057,911 B2
(45) Date of Patent: Jul. 6, 2021

(54) WIRELESS SPEAKER SYSTEM

(71) Applicant: Beken Corporation, Shanghai (CN)

(72) Inventors: Weifeng Wang, Shanghai (CN); Lulai Chen, Shanghai (CN)

(73) Assignee: Beken Corporation, Shanghai (CN)

(*) Notice: Subject to any disclaimer, the term of this patent is extended or adjusted under 35 U.S.C. 154(b) by 82 days.

(21) Appl. No.: 16/655,903

(22) Filed: Oct. 17, 2019

(65) Prior Publication Data
US 2021/0068127 A1 Mar. 4, 2021

(30) Foreign Application Priority Data
Sep. 3, 2019 (CN) .......................... 201910828859.4

(51) Int. Cl.
| | |
|---|---|
| *H04W 72/12* | (2009.01) |
| *H04R 3/00* | (2006.01) |
| *H04W 76/10* | (2018.01) |
| *H04L 5/00* | (2006.01) |
| *H04B 1/38* | (2015.01) |
| *H04W 84/18* | (2009.01) |

(52) U.S. Cl.
CPC .......... *H04W 72/1263* (2013.01); *H04B 1/38* (2013.01); *H04L 5/0055* (2013.01); *H04R 3/00* (2013.01); *H04W 76/10* (2018.02); *H04R 2420/07* (2013.01); *H04W 84/18* (2013.01)

(58) Field of Classification Search
CPC .......... H04B 1/38; H04L 1/16; H04L 5/0055; H04L 2001/0092; H04L 2001/0097; H04R 3/00; H04R 3/12; H04R 5/02; H04R 5/04; H04R 2420/05; H04R 2420/07; H04W 4/50; H04W 72/1263; H04W 76/10; H04W 84/18; H04W 4/80
See application file for complete search history.

(56) References Cited

U.S. PATENT DOCUMENTS

| | | | | |
|---|---|---|---|---|
| 8,102,836 | B2 * | 1/2012 | Jerlhagen | ................ H04L 47/14 370/350 |
| 8,150,475 | B2 * | 4/2012 | Gilmore, II | ......... H04M 1/6075 455/572 |

(Continued)

OTHER PUBLICATIONS

"U.S. Appl. No. 15/929,516, Non-Final Office Action dated Nov. 23, 2020", 11 pgs.

(Continued)

*Primary Examiner* — Frank Duong
(74) *Attorney, Agent, or Firm* — Schwegman Lundberg & Woessner, P.A.

(57) ABSTRACT

A wireless speaker system includes a first transceiver and a second transceiver. The first transceiver is configured to establish a first wireless link with a data source for receiving a plurality of data packets, and to establish a second wireless link with a second transceiver for transmitting a set of parameters to the second transceiver to enable the second transceiver to sniff the plurality of data packets from the data source. The first transceiver is further configured to send a second acknowledgment to the data source via the first wireless link upon failure to receive the plurality of data packets from the data source via the first wireless link and upon receiving a first acknowledgment from the second wireless transceiver via the second wireless link.

20 Claims, 9 Drawing Sheets

(56) References Cited

U.S. PATENT DOCUMENTS

| | | | |
|---|---|---|---|
| 8,660,055 B2 * | 2/2014 | Ueda | H04B 1/385 |
| | | | 370/315 |
| 8,724,600 B2 * | 5/2014 | Ramsay | H04N 21/43615 |
| | | | 370/338 |
| 8,768,252 B2 | 7/2014 | Watson et al. | |
| 9,621,987 B2 * | 4/2017 | Watson | H04R 5/04 |
| 9,788,117 B2 * | 10/2017 | Watson | H04R 3/12 |
| 9,820,323 B1 * | 11/2017 | Young | H04W 4/80 |
| 9,838,829 B2 * | 12/2017 | El-Hoiydi | H04W 4/80 |
| 9,949,205 B2 * | 4/2018 | Newham | H04R 1/1091 |
| 10,015,623 B2 * | 7/2018 | Thoen | G06F 3/0346 |
| 10,104,474 B2 * | 10/2018 | Watson | H04L 1/16 |
| 10,178,711 B2 * | 1/2019 | Li | H04W 88/04 |
| 10,206,039 B1 * | 2/2019 | Yun | G06F 3/165 |
| 10,212,569 B1 * | 2/2019 | Huang | H04W 84/18 |
| 10,244,468 B2 * | 3/2019 | Newham | H04W 52/0206 |
| 10,299,300 B1 * | 5/2019 | Young | H04R 3/12 |
| 10,348,370 B2 * | 7/2019 | Thoen | H04B 5/0031 |
| 10,356,232 B1 * | 7/2019 | Nalakath | H04M 1/6066 |
| 2011/0270428 A1 | 11/2011 | Tam | |
| 2013/0316642 A1 | 11/2013 | Newham | |
| 2017/0055089 A1 | 2/2017 | Pedersen et al. | |
| 2018/0084456 A1 | 3/2018 | Gostev et al. | |
| 2018/0084606 A1 | 3/2018 | Li et al. | |
| 2019/0174557 A1 | 6/2019 | Ueda et al. | |
| 2020/0100029 A1 | 3/2020 | Watson et al. | |
| 2020/0107387 A1 | 4/2020 | Li et al. | |
| 2020/0252993 A1 | 8/2020 | Srivastava et al. | |
| 2020/0288519 A1 | 9/2020 | Cheong et al. | |

OTHER PUBLICATIONS

"U.S. Appl. No. 15/929,516, Response filed Dec. 2, 2020 to Non-Final Office Action dated Nov. 23, 2020", 9 pgs.

U.S. Appl. No. 15/929,516, filed May 6, 2020, Wireless Speaker System.

* cited by examiner

WIRELESS SPEAKER SYSTEM

CROSS REFERENCE TO RELATED APPLICATIONS

This application claims priority to CN 201910828859.4 filed Sep. 3, 2019 and incorporated herein by reference in its entirety.

TECHNICAL FIELD

The present disclosure generally relates to systems and methods for wireless transmission of data and more particularly, but not exclusively to coordinating the transmission of data between two receiving devices and a transmitting device.

BACKGROUND

Wireless communication is the transfer of information or power between two or more points that are not connected by an electrical conductor. For common wireless technologies using radio waves, the communication distances can be short, such as a few meters for Bluetooth, or it can be as far as millions of kilometers for deep-space radio communications.

The problem in some configurations of wireless speaker systems is that only a main speaker is configured to receive data from data source and transmit data to the other speaker. Therefore, once the main speaker fails to receive the data or a portion of it from the data source, the data source has to re-transmit the missing data to the main speaker which in turn sends data to the other speaker to playback, resulting in inefficient data transmission. It can cause problems such as faster draining of the battery in the main speaker, and longer time for data synchronization between the speakers to playback. As a result, users may experience intermittent ("stuttering") playback or sometimes even silence during audio/video streaming or phone calls.

SUMMARY

An embodiment provides an apparatus comprising a first transceiver. The first transceiver is configured to establish a first wireless link with a data source for receiving a plurality of data packets, and to establish a second wireless link with a second transceiver for transmitting a set of parameters to the second transceiver to enable the second transceiver to sniff the plurality of data packets from the data source. The first transceiver is further configured to send a second acknowledgment to the data source via the first wireless link upon failure to receive the plurality of data packets from the data source via the first wireless link and upon receiving a first acknowledgment from the second wireless transceiver via the second wireless link.

In an embodiment of the apparatus, the first transceiver is configured to receive the plurality of data packets from the second transceiver via the second wireless link after the first transceiver transmits the second acknowledgment to the data source.

In an embodiment of the apparatus, the first and second transceivers are configured to respectively extract a first audio channel and a second audio channel from the plurality of data packets.

In an embodiment of the apparatus, the set of parameters comprises device address, frequency information, communication band information, native clock information, logical transport address, clock offset information and link key information.

In an embodiment of the apparatus, the second wireless link is implemented as a combination of a first Bluetooth piconet and a proprietary wireless communication link.

In an embodiment of the apparatus, the second wireless link is implemented as the proprietary wireless communication link.

In an embodiment of the apparatus, the first acknowledgment may be transmitted during an idle period before the start of a next time slot.

An embodiment provides a system comprising a first transceiver and a second transceiver. The first transceiver configured to establish a first wireless link with a data source for receiving a plurality of data packets, and to establish a second wireless link with the second transceiver for transmitting a set of parameters to the second transceiver to enable the second transceiver to detect the plurality of data packets from the data source. The first transceiver is further configured to send a second acknowledgment to the data source via the first wireless link upon failure to receive the plurality of data packets from the data source via the first wireless link and upon receiving a first acknowledgment from the second wireless transceiver via the second wireless link. The second transceiver is configured to receive the set of parameters from the first transceiver via the second wireless link, and sniff the plurality of data packets from the data source. The second transceiver is further configured to send the first acknowledgment to the first transceiver via the second wireless link upon obtaining the plurality of data packets from the data source via the enabled wireless link.

In an embodiment of the system, the second transceiver is configured to send the plurality of data packets to the first transceiver via the second wireless link after the first transceiver sends the second acknowledgment to the data source.

In an embodiment of the system, the first and second transceivers are configured to respectively extract a first audio channel and a second audio channel from the plurality of data packets.

In an embodiment of the system, the second wireless link is implemented as a combination of a first Bluetooth piconet and a proprietary wireless communication link.

In an embodiment of the system, the first acknowledgment is transmitted during an idle period before the start of a next time slot.

In an embodiment, a method comprises establishing a first wireless link with a data source, by a first transceiver, for receiving a plurality of data packets; establishing a second wireless link with a second transceiver, by the first transceiver, for transmitting a set of parameters to the second transceiver to enable the second transceiver to sniff the plurality of data packets from the data source; sending a second acknowledgment to the data source via the first wireless link, by the first transceiver, upon failure to receive the plurality of data packets from the data source via the first wireless link and upon receiving a first acknowledgment from the second wireless transceiver via the second wireless link.

In an embodiment of the method, it further comprises receiving the plurality of data packets, by the first transceiver, from the second transceiver via the second wireless link.

In an embodiment of the method, the first transceiver receives the plurality of data packets from the second transceiver after the first transceiver receives the first acknowledgment from the second transceiver.

In an embodiment of the method, the first and second transceivers are configured to respectively extract a first audio channel and a second audio channel from the plurality of data packets.

In an embodiment of the method, the method supports scatternet operation.

In an embodiment of the method, the set of parameters comprises device address, frequency information, communication band information, native clock information, logical transport address, clock offset information and link key information.

In an embodiment of the method, the second wireless link is implemented as a combination of a first Bluetooth piconet and a proprietary wireless communication link.

In an embodiment of the method, the second wireless link is implemented as the proprietary wireless communication link.

In an embodiment a system comprises: one or more processors of a machine; and a memory storing instruction that, when executed by the one or more processors, cause the machine to perform operations. The operations comprise establishing a first wireless link with a data source, by a first transceiver, for receiving a plurality of data packets; establishing a second wireless link with a second transceiver, by the first transceiver, for transmitting a set of parameters to the second transceiver to enable the second transceiver to sniff the plurality of data packets from the data source; and sending a second acknowledgment to the data source via the first wireless link upon failure to receive the plurality of data packets from the data source via the first wireless link and upon receiving a first acknowledgment from the second wireless transceiver via the second wireless link. This system can also perform other embodiments of the methods as described herein. In an embodiment, a machine-readable storage device embodying instructions that, when executed by a machine, cause the machine to perform operations comprising the methods described herein.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various aspects and examples will now be described. The following description provides specific details for a thorough understanding and enabling description of these examples. Those skilled in the art will understand, however, that the disclosure may be practiced without many of these details.

Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples. Certain terms may even be emphasized below, however, any terminology intended to be interpreted in any restricted manner will be overtly and specifically defined as such in the Glossary section.

Figure 1:
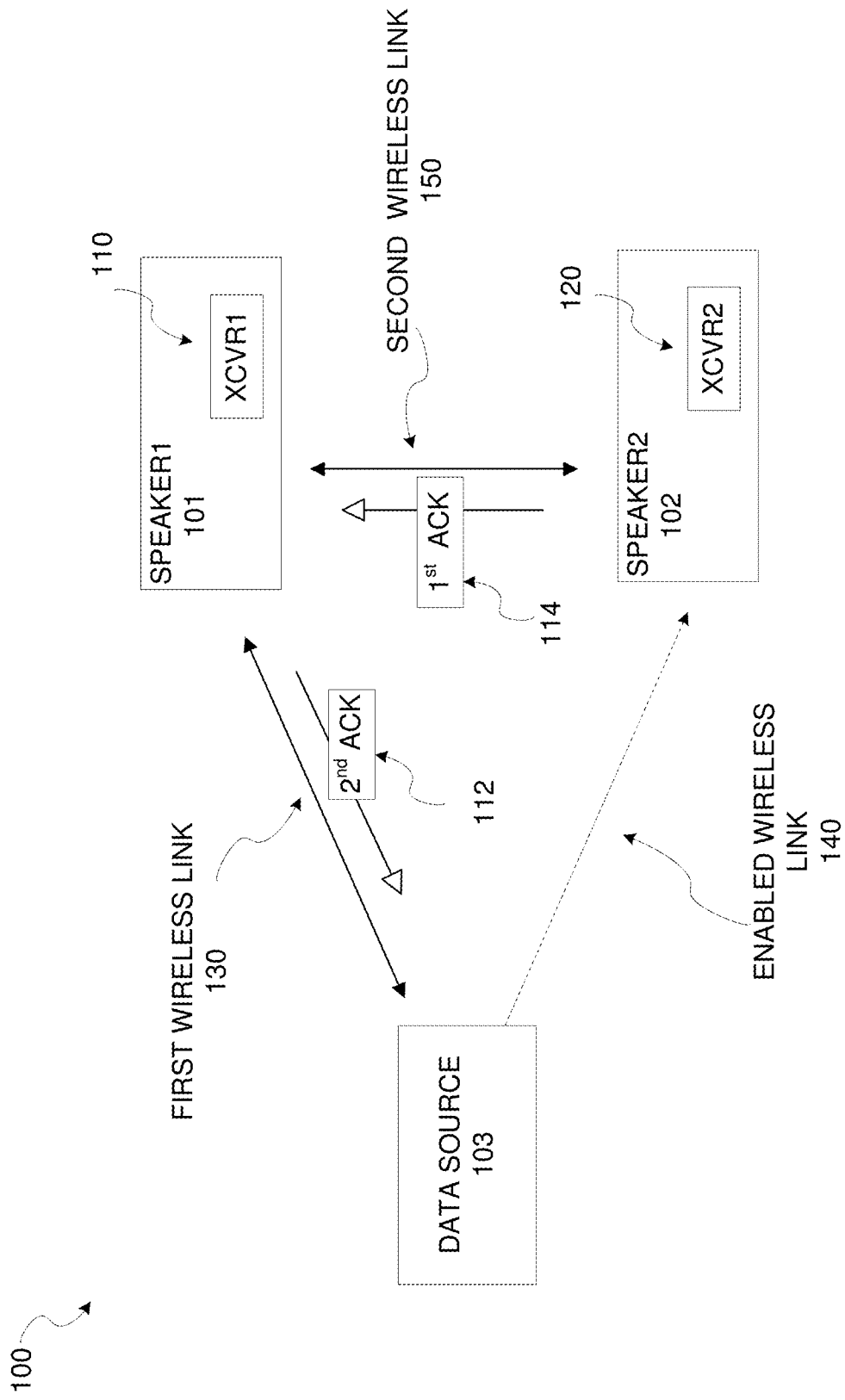
FIG. 1 is a block diagram of a wireless speaker system implemented according to another embodiment.

FIG. 1 is a block diagram of a wireless speaker system 100 implemented according to another embodiment. The first speaker 101 includes a first transceiver (XCVR1) 110, and the second speaker 102 includes a second transceiver (XCVR2) 120. The first and second speakers may include but not limited to loudspeakers which receive audio signals using radio frequency waves rather than audio cables, such as earpiece, earbuds, earphones, headset, headphones, smart speakers, or devices that include speakers, such as mobile phones, laptops, etc.

The transceiver of one of the speakers, such as the first transceiver 110 is configured to establish a first wireless link 130 with the data source 103. The transceiver of one of the speakers, such as the first transceiver 110 is configured to establish a second wireless link 150 with the second transceiver 120. In one embodiment, the second wireless link 150 may be configured at manufacture to permanently pair the first transceiver 110 and the second transceiver 120 and have the second wireless link 150 while powered up.

In an embodiment, the data source 103 transmits a stream of audio data to first transceiver 110, in the form of a plurality of data packets. Each packet may incorporate stereo audio data in the form of either compressed uncompressed data samples. The audio data may comprise a first and a second audio channels, such as a left audio channel and a right audio channel. The first transceiver 110 is configured to transmit a set of communication parameters to the second transceiver 120 to enable the second transceiver 120 to sniff the communications on the first wireless link 130 via an enabled wireless link 140. In an embodiment, the communication parameters include but not limited to device address, Bluetooth address, hopping frequency, data transmission rates, codec format, bitpool value, sample rate, wireless transmission profile information, native clock value, logical transport address, clock offset value and link key value, etc.

In an embodiment, the second transceiver 120 transmits a first acknowledgment information 114 to first transceiver 110 via the second wireless link 150 when it successfully obtained the audio data by sniffing from the first wireless link 130. When the first transceiver 110 failed to receive the audio data from data source 103 but received the first acknowledgment information 114 from the second transceiver 120 via the second wireless link 150, the first transceiver 110 then transmits a second acknowledgment information 112 to the data source 103 via the first wireless link 130 acknowledging the receipts of the audio data. The second transceiver 120 subsequently transmits the audio data to the first transceiver 110 via the second wireless link 150.

In an embodiment, once both the first speaker 101 and the second speaker 102 receive the audio data, one speaker extracts one of the audio channels such as the left audio channel, and the other speaker extracts the other audio channel such as the right audio channel to its respective local buffers (not shown) for playback.

Figure 2:
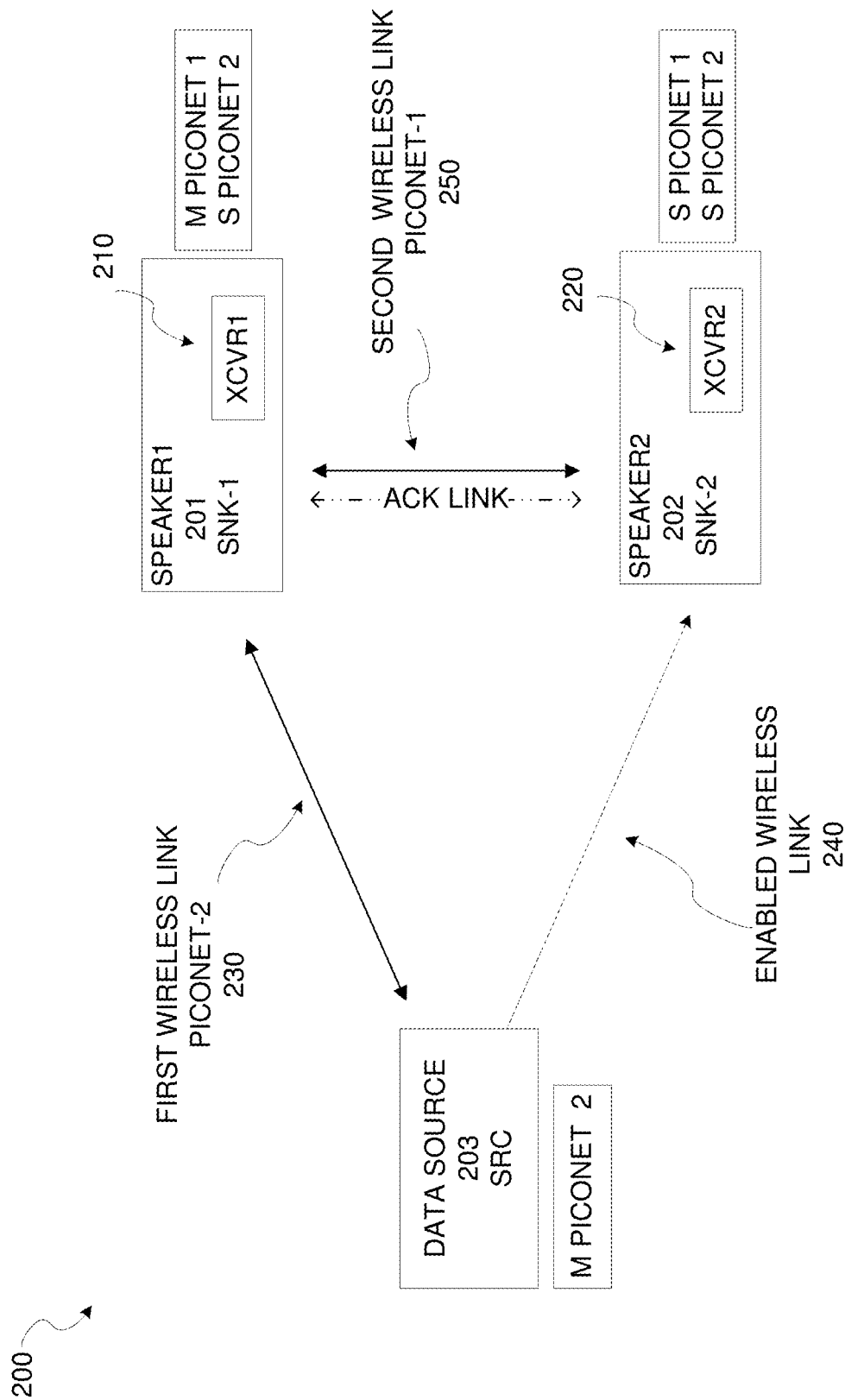
FIG. 2 is a block diagram of a wireless speaker system implemented according to a more specific embodiment using Bluetooth Audio Distribution Profile (A2DP) for wireless communication.

FIG. 2 is a block diagram of a wireless speaker system 200 implemented according to a more specific embodiment using Bluetooth Audio Distribution Profile (A2DP) for wireless communication.

A2DP profile defines a device as Source (SRC) when it acts as a source of a digital audio stream that is delivered to the SNK of the piconet, and defines a device as the Sink (SNK) when it acts as a sink of digital audio stream delivered from the SRC on the same piconet. In an embodiment using Bluetooth A2DP as the wireless communication method, the wireless speaker system includes a data source 203 configured as SRC, a first speaker 201 configured as SNK-1, and a second speaker 202 configured as SNK-2. The second wireless link 250 is implemented as a first Bluetooth piconet PICONET1, or as a combination of a first Bluetooth piconet PICONET1 and a proprietary wireless communication link (ACK LINK), which is dedicated to transmit acknowledgment information. The ACK LINK may operate on the same channel as PICONET1 or PICONET2, or it may operate on a different channel. The second wireless link 250 can also be implemented as a proprietary wireless communication link alone.

In an embodiment, the acknowledgment information may be transmitted during the idle period between the end of any packet and the start of the next time slot, or the acknowledgment information may be transmitted in the next time slot.

In an embodiment, the first speaker 201 as SNK-1 is the master (M) of PICONET1. The second speaker 202 as SNK-2 is the slave (S) of PICONET1. The first wireless link 230 is implemented as a second Bluetooth piconet PICONET2, where the data source 203 as the SRC is the master (M), the first speaker 201 as SNK-1 is a slave (S) of PICONET2, and the second speaker 202 as SNK-2 is another slave (S) of PICONET2. Because SNK-1 and SNK-2 participate in two piconets simultaneously, the wireless speaker system can support scatternet operation.

In an embodiment, SNK-1 is the speaker that is the first to be switched on, such as being physically taken out of a charging station. In an embodiment, after the SNK-1 201 is connected to SRC 203 via the PICONET2, SNK-1 201 sends a set of parameters to SNK-2 via PICONET1 to enable the SNK-2 to sniff communication on PICONET2. Those skilled in the art shall appreciate that SNK-2 202 may be configured in such way that as soon as it receives the set of parameters including but not limited to device address, Bluetooth address, hopping frequency, data transmission rates, codec format, bitpool value, sample rate, wireless transmission profile information, native clock value, logical transport address, clock offset value and link key value, etc. from SNK-1 201 after SNK-1 201 establishes the first wireless link 230 with the data source 203, SNK-2 is able to obtain the data packets transmitted in the first wireless link 230 via the enabled wireless link 240, and decrypt with the link key if needed and utilize the data packets using the set of the parameters.

In an embodiment, the wireless speaker system may be implemented according other protocol such as WIFI or other Bluetooth profiles such as Hands-free profile (HFP), Serial Port Profile (SPP), etc.

Figure 3:
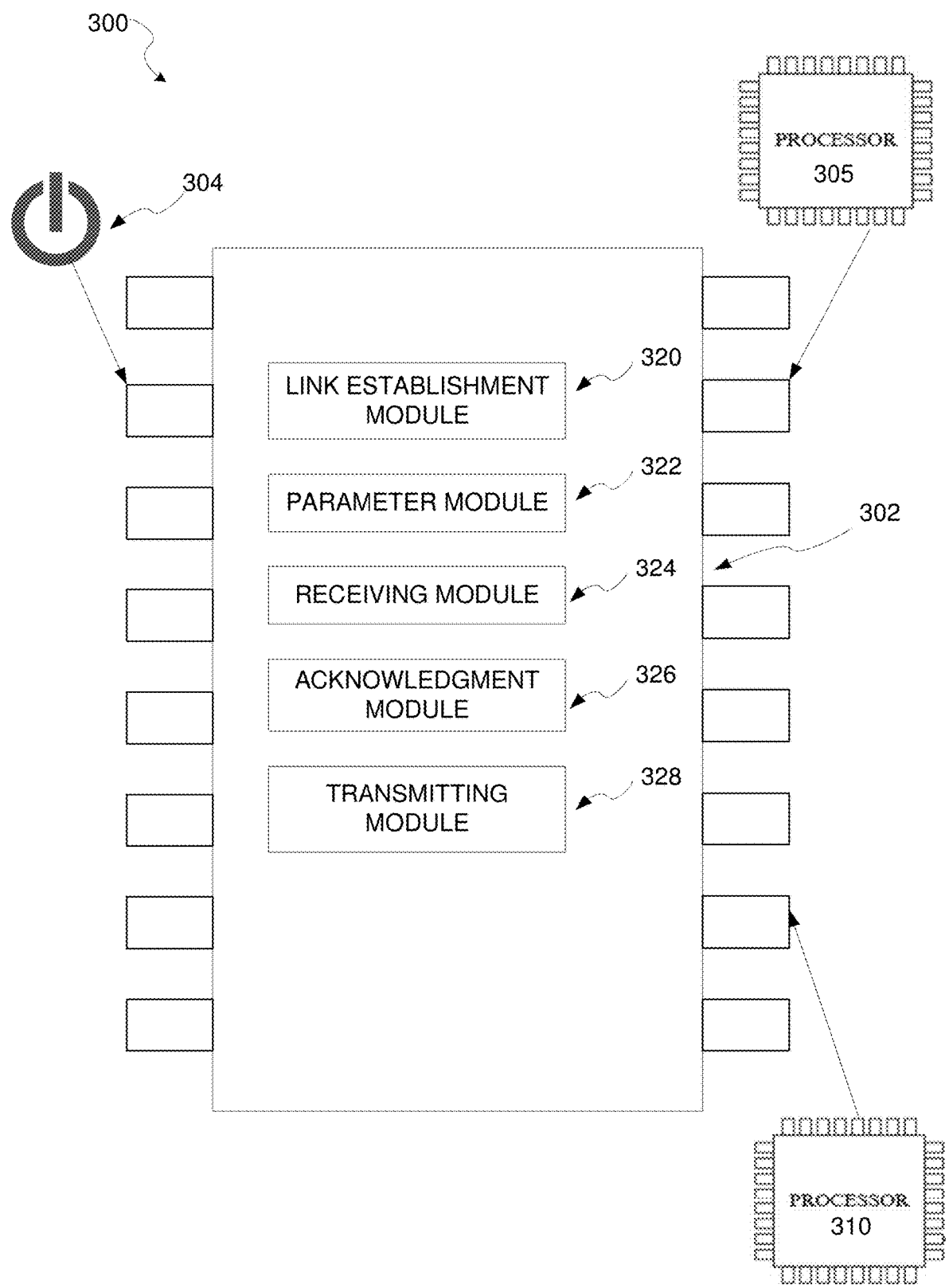
FIG. 3 is a diagrammatic representation of a processing environment in the first speaker, in accordance with some example embodiments.

FIG. 3 is a diagrammatic representation of a processing environment 300 in the first speaker 101, 201, in accordance with some example embodiments. A diagrammatic representation of a processing environment 300 includes the processor 305, the processor 310, and a processor 302 (e.g., a GPU, CPU or combination thereof).

In an embodiment, the processor 302 in the first speaker 101, 201 is shown to be coupled to a power source 304, and to include (either permanently configured or temporarily instantiated) modules, namely a link establishment module 320, a parameter module 322, a receiving module 324, an acknowledgment module 326 and a transmitting module 328. The link establishment module 320 operationally establishes a first wireless link 130, 230 with a data source 103, 203 and establishes a second wireless link 150, 250 with a second receiver 120, 220. The parameter module 322 operationally generates a set of communication parameters and transmits the set of communication parameters to the second transceiver 120, 220 to enable the second transceiver 120, 220 to sniff the data communication on the first wireless link 130, 230. The receiving module 324 operationally receives a stream of audio data from the data source 103, 203. The acknowledgment module 326 operationally receives the first acknowledgment information 114 from the second transceiver 120, 220. The transmitting module 328 operationally sends the second acknowledgment information 112 to the data source 103, 203, and transmits the stream of audio data to the local buffer to playback. As illustrated, the processor 302 is communicatively coupled to both the processor 305 and processor 310.

Figure 4:
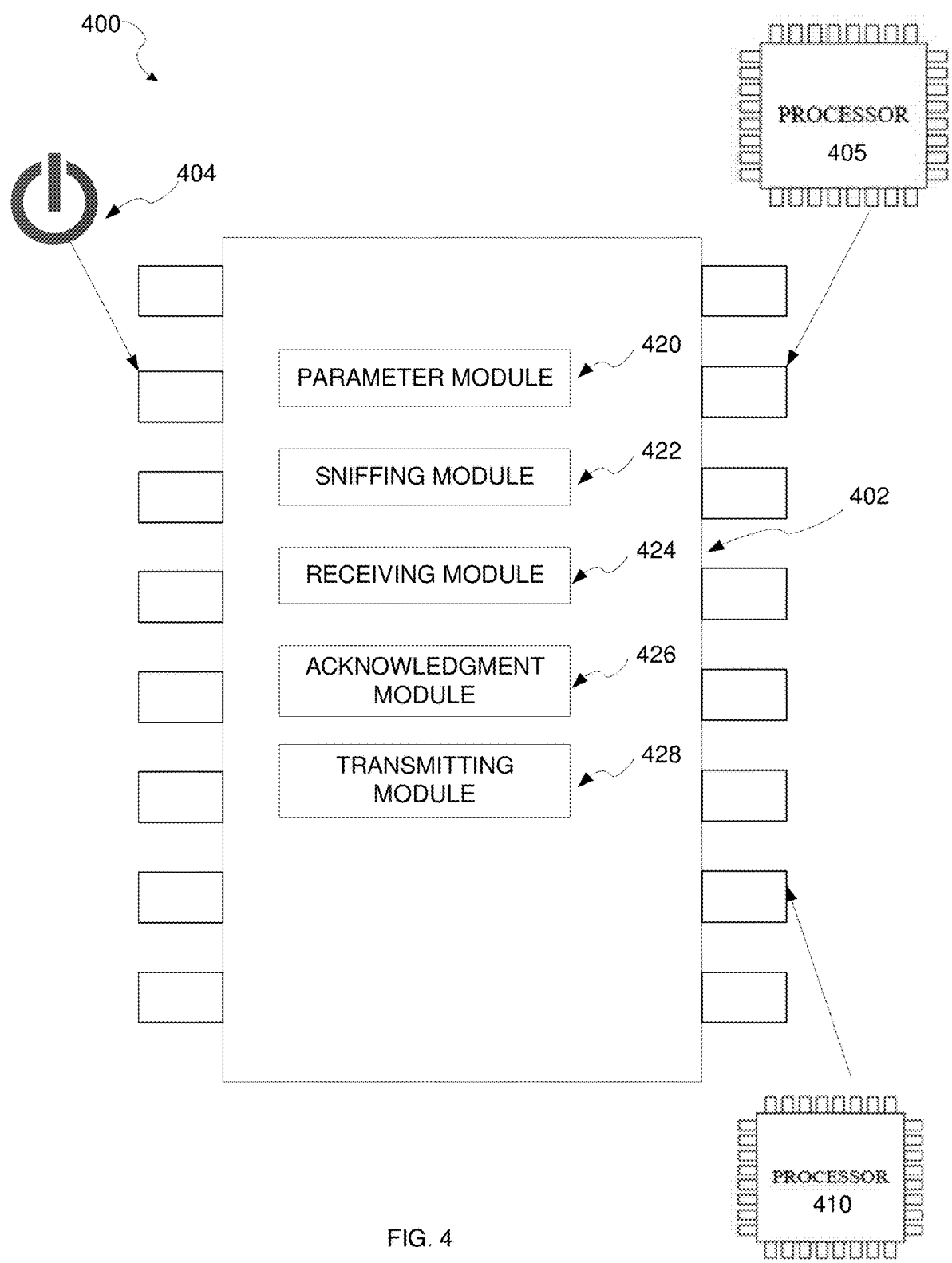
FIG. 4 is a diagrammatic representation of a processing environment in the second speaker, in accordance with some example embodiments.

FIG. 4 is a diagrammatic representation of a processing environment 400 in the second speaker 102, 202, in accordance with some example embodiments. A diagrammatic representation of a processing environment 400 includes the processor 405, the processor 410, and a processor 402 (e.g., a GPU, CPU or combination thereof).

In an embodiment, the processor 402 in the second speaker 102, 202 is shown to be communicatively coupled to a power source 404, and to include (either permanently configured or temporarily instantiated) modules, namely a parameter module 420, a sniffing module 422, a receiving module 424, an acknowledgment module 426 and a transmitting module 428. The parameter module 420 operationally receives a set of parameters from the first transceiver 110, 210. The sniffing module 422 operationally sniffs data communication on the first wireless link 130, 230 from the data source 103, 203. The receiving module 424 operationally determines if the second transceiver 120, 220 receives a stream of audio data via sniffing on the first wireless link 130, 230. The acknowledgment module 426 operationally sends the first acknowledgment information 114 to the first transceiver 110, 210 if the receiving module received the stream of audio data. The transmitting module 428 operationally sends the stream of audio data to the first transceiver 110, 210 and sends the stream of audio data to its local buffer to playback. As illustrated, the processor 402 is communicatively coupled to both the processor 405 and processor 410.

Figure 5:
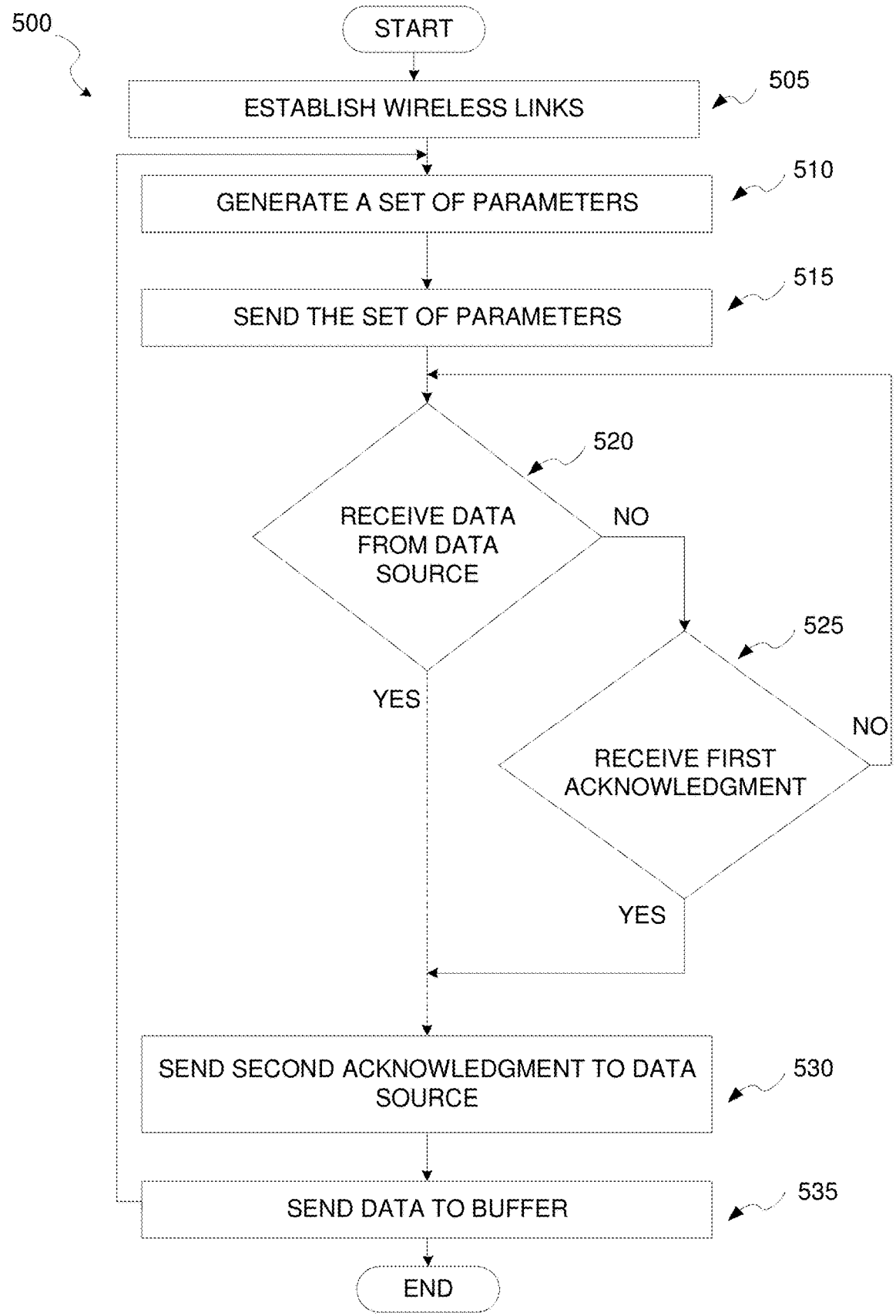
FIG. 5 is a flow diagram of the first speaker in a wireless speaker system implemented according to another embodiment.

FIG. 5 is a flow diagram of the first speaker 101, 201 in a wireless speaker system 500 implemented according to another embodiment. While the various operations in this diagram are presented and described sequentially, one of ordinary skill will appreciate that some or all of the operations may be executed in a different order, be combined or omitted, or be executed in parallel.

In an embodiment, the first transceiver 110, 210 communicatively coupled with the first speaker 101, 201 establishes 505 wireless links including the first wireless link 130, 230 with the data source 103, 203 and the second wireless link 150, 250 with the second transceiver 120, 220. The first transceiver 110, 210 generates 510 a set of parameters including but not limited to device address, Bluetooth address, hopping frequency, data transmission rates, codec format, bitpool value, sample rate, wireless transmission profile information, native clock value, logical transport address, clock offset value and link key value, etc. The first transceiver 110, 210 sends 515 the set of parameters to the second transceiver 120, 220 which is communicatively coupled to the second speaker 102, 202. The first transceiver 110, 210 determines 520 if it has received data from data source 103, 203. If the first transceiver 110, 210 has received data from data source 103, 203, then it sends 530 the second acknowledgment information 112 to data source 103, 203. If the first transceiver 110, 210 has not received data from data source 103, 203, the first transceiver 110, 210 determines 525 if it has received the first acknowledgment information 114 from the second transceiver 120, 220. If the first transceiver 110, 210 has received the first acknowledgment information 114 from the second transceiver 120, 220, the first transceiver 110, 210 sends 530 the second acknowledgment information 112 to the data source 103, 203. If the first transceiver 110, 210 has not received the first acknowledgment information 114 from the second transceiver 120, 220, the first transceiver 110, 210 determines 520 if it has received data from the data source 103, 203. After the first transceiver 110, 210 sends 530 the second acknowledgment information 112 to data source 103, 203, the first transceiver 110, 210 sends 535 data to its local buffer to playback.

Figure 6:
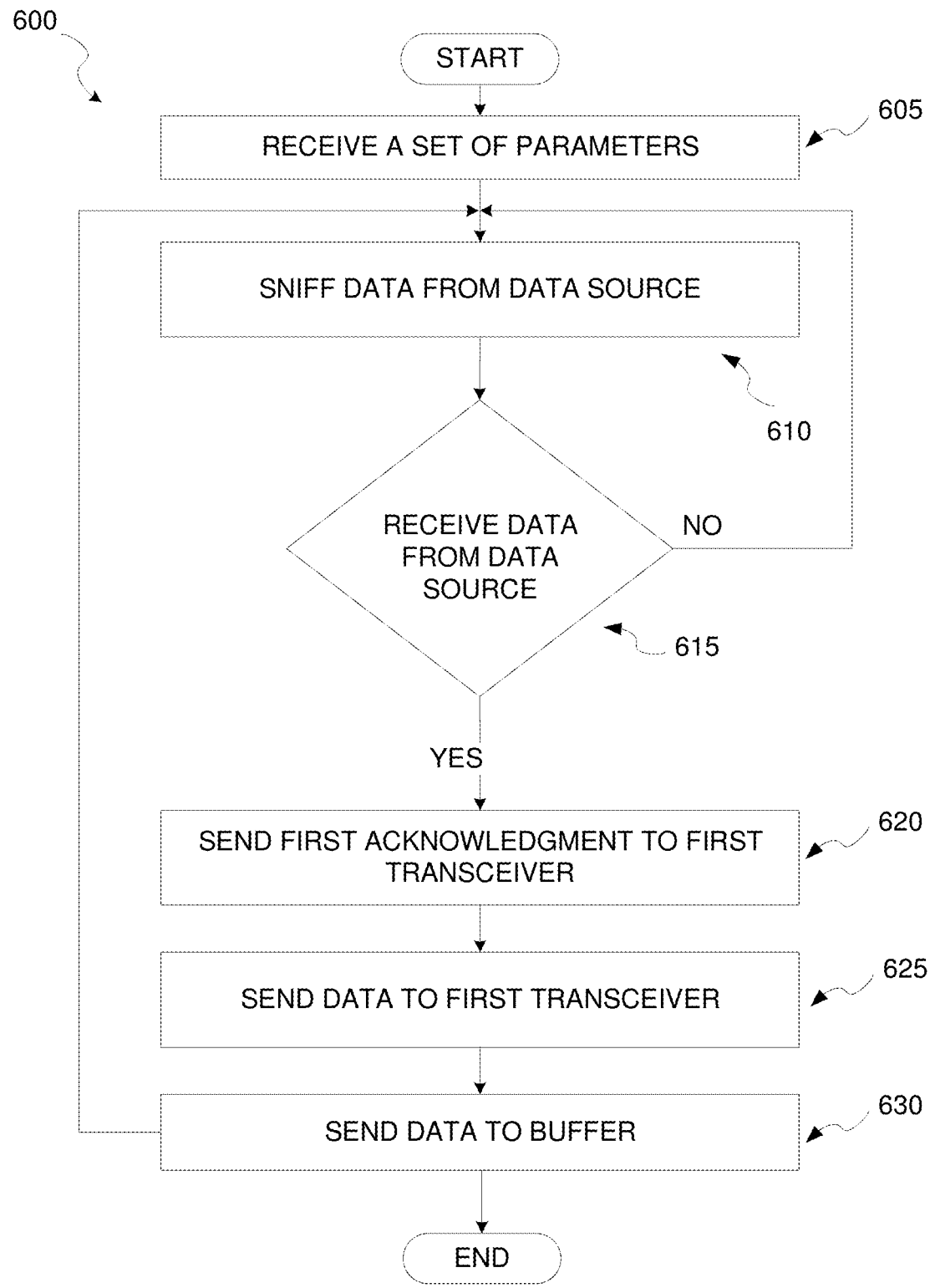
FIG. 6 is a flow diagram of the second speaker in a wireless speaker system implemented according to another embodiment.

FIG. 6 is a flow diagram of the second speaker 102, 202 in a wireless speaker system 600 implemented according to another embodiment. While the various operations in this diagram are presented and described sequentially, one of ordinary skill will appreciate that some or all of the operations may be executed in a different order, be combined or omitted, or be executed in parallel. In an embodiment, the second transceiver 120, 220 communicatively coupled to the second speaker 102, 202 receives 605 a set of parameters including but not limited to device address, Bluetooth address, hopping frequency, data transmission rates, codec format, bitpool value, sample rate, wireless transmission profile information, native clock value, logical transport address, clock offset value and link key value, etc. The second transceiver 120, 220 sniffs 610 data from data source 103, 203 on the first wireless link 130, 230 via the enabled wireless link 140, 240. The second transceiver 120, 220 determines 615 if it has obtained data from data source 103, 203 via sniffing. If second transceiver 120, 220 has received data from data source 103, 203, the second transceiver 120, 220 sends 620 the first acknowledgment information to first transceiver 110, 210 via the second wireless link 150, 250. If second transceiver 120, 220 has not received data from data source 103, 203, the second transceiver 120, 220 continues sniffing 610 data from data source 103, 203 on the first wireless link 130, 230 via the enabled wireless link 240. After the second transceiver 120, 220 sends 620 the first acknowledgment information 114 to first transceiver 110, 210 via the second wireless link 150, 250, the second transceiver 120, 220 sends 625 the data to the first transceiver 110, 210. The second transceiver 120, 220 then sends 630 the data to its local buffer to playback.

In another embodiment, the second transceiver 120, 220 may also receive data from the data source 103, 203 via the first transceiver 110, 210 transmitting via the second wireless link 150, 250 the data it has received from data source 103, 203 via the first wireless link 130, 230.

Figure 7:
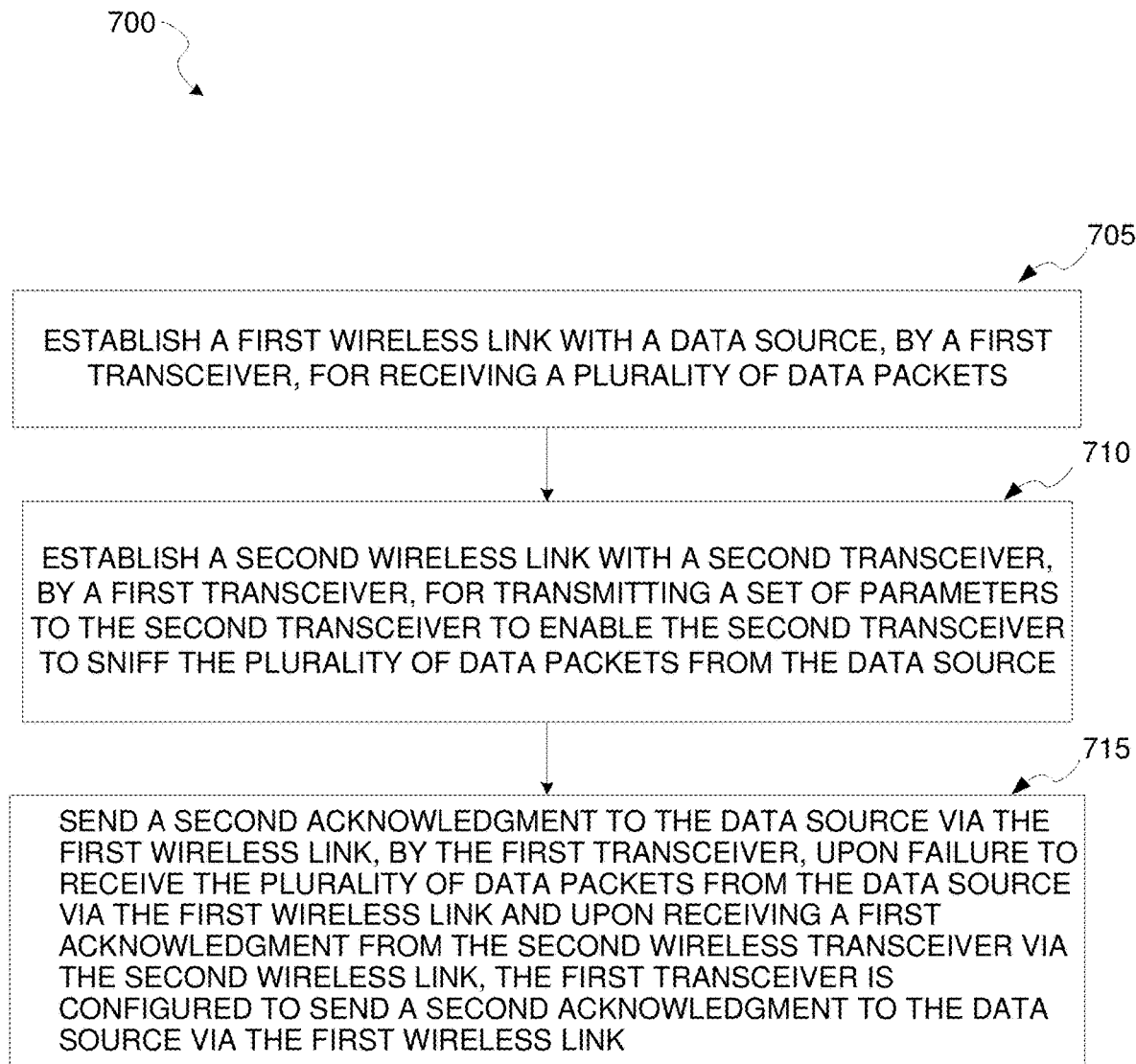
FIG. 7 is a flow diagram illustrating a method of operating a wireless speaker system according to an embodiment.

FIG. 7 is a flow diagram illustrating a method of operating a wireless speaker system 700 according to an embodiment. While the various operations in this diagram are presented and described sequentially, one of ordinary skill will appreciate that some or all of the operations may be executed in a different order, be combined or omitted, or be executed in parallel. At operation 705, the first transceiver 110, 210 establishes a first wireless link 130, 230 with a data source 103, 203 for receiving a plurality of data packets. At operation 710, the first transceiver 110, 210 establishes a second wireless link 150, 250 with a second transceiver 120, 220 for transmitting a set of parameters to the second transceiver 120, 220 to enable the second transceiver 120, 220 to sniff the plurality of data packets from the data source 103, 203. At operation 715, the first transceiver 110, 210 sends a second acknowledgment information 112 to the data source 103, 203 via the first wireless link 130, 230, by the first transceiver 110, 210, upon failure to receive the plurality of data packets from the data source 103, 203 via the first wireless link 130, 230 and upon receiving a first acknowledgment information 114 from the second wireless transceiver via the second wireless link 150, 250, the first transceiver 110, 210 is configured to send a second acknowledgment information 112 to the data source 103, 203 via the first wireless link 130, 230.

While embodiments have been described with respect to audio data, any sort of data can be used in the embodiments, such as video, text, static images, etc.

Software Architecture

Figure 8:
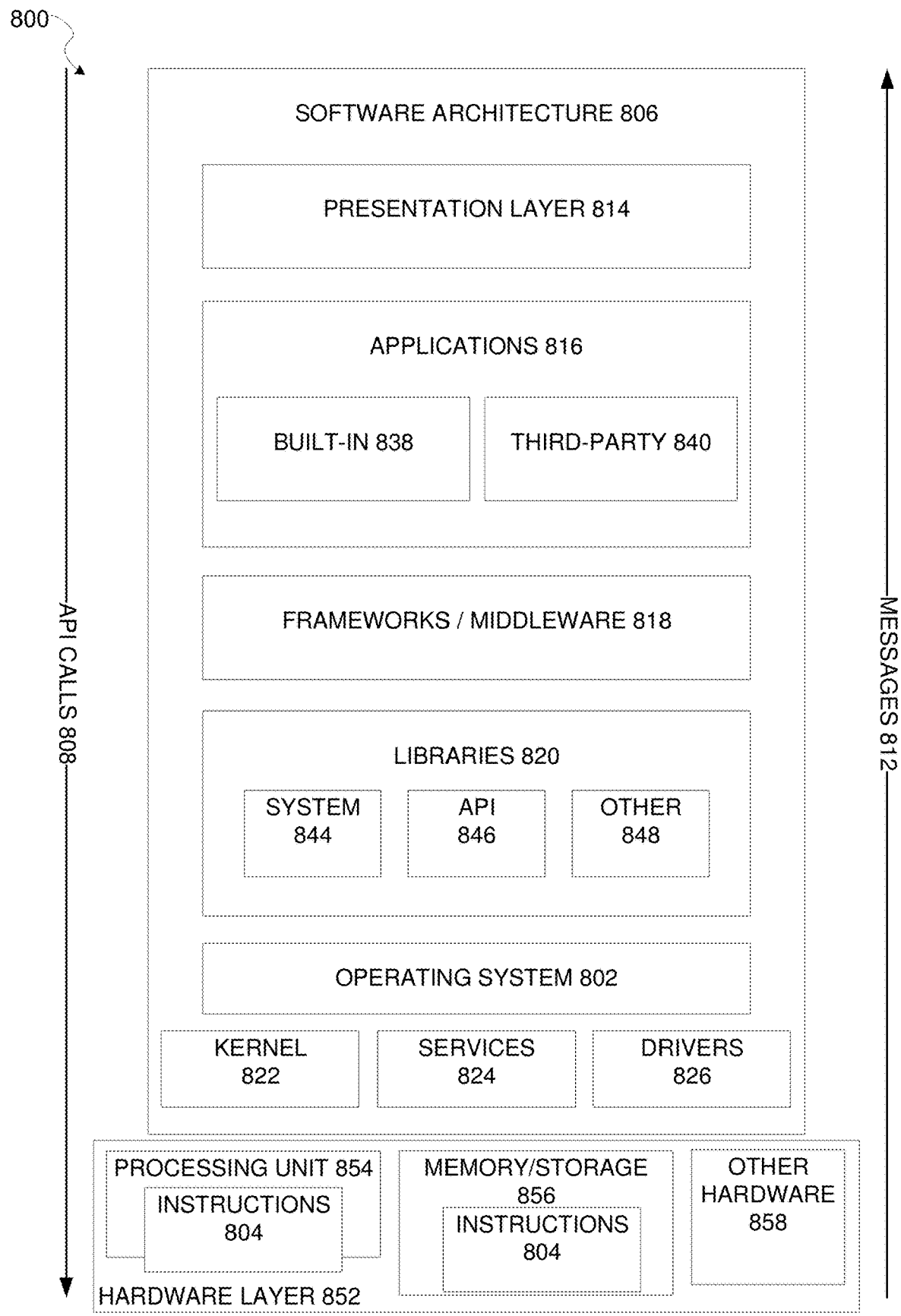
FIG. 8 is a block diagram illustrating a representative software architecture, which may be used in conjunction with various hardware architectures herein described.

FIG. 8 is a block diagram illustrating an example software architecture 806, which may be used in conjunction with various hardware architectures herein described, such as the first speaker 101, 201 or the second the speaker 102, 202. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
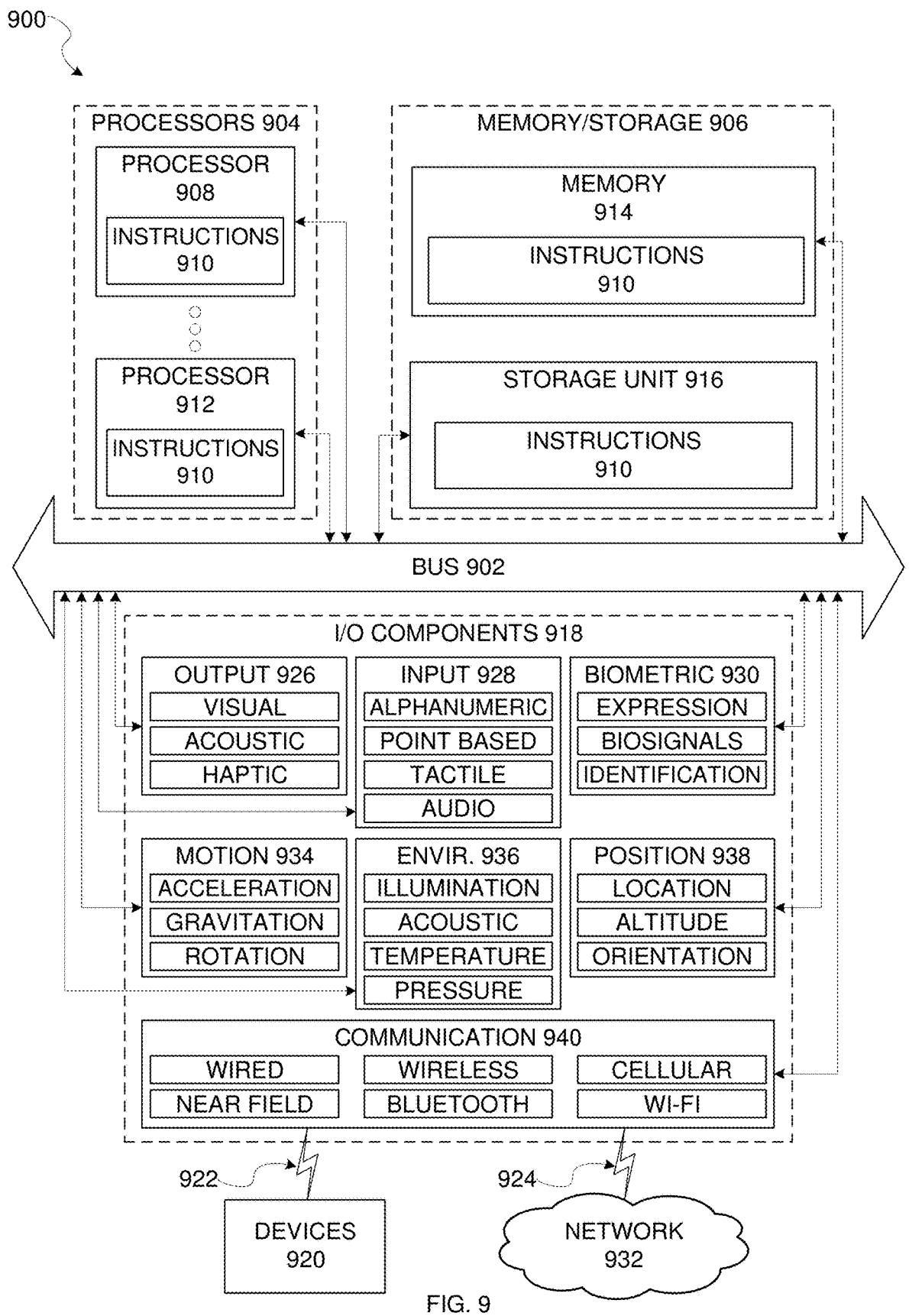
FIG. 9 is a block diagram illustrating components of a machine, according to some example embodiments, able to read instructions from a machine-readable medium (e.g., a machine-readable storage medium) and perform any one or more of the methodologies discussed herein

FIG. 9 is a block diagram illustrating components of a machine 900, such as the first speaker 101, 201 or the second speaker 102, 202 according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present disclosure. Moreover, features of one embodiment may be incorporated into other embodiments, even where those features are not described together in a single embodiment within the present document. Accordingly, the disclosure is described by the appended claims.

Glossary

The term "DATA" as used herein refers to audio, video, or monophonic voice information. The term "speaker" includes but not limited to any electro-acoustic transducer, such as home and professional audio speakers and headphones, earphones, ear buds, etc. The term "data source" refers to any electronic device for storing and processing data according to instructions given to it in a variable program, such as computers and mobile devices. Mobile devices may include mobile phone, a portable game player, a portable media player (e.g., MP3 player), or tablet computer, or any piece of portable electronic equipment that can connect to the internet or any wireless network.

The term "STANDARD WIRELESS PROTOCOL" as used herein refers to any open or publicly available wireless protocol or any wireless protocol that is a product of a standards body or special interest group, which includes but is not limited to Bluetooth, Wi-Fi® (based on the IEEE 802.11 family of standards). In order to adopt Bluetooth protocol, a device must be compatible with the subset of Bluetooth profiles. Bluetooth profiles in the context include but not limited to Advanced Audio Distribution Profile (A2DP), Hands-free profile (HFP), Serial Port Profile (SPP), etc. The term "proprietary wireless protocol" as used herein refers to any wireless protocol other than a standard wireless protocol. Bluetooth is a standard protocol for sending and receiving data via a 2.4 GHz wireless link. It's designed for short-ranged wireless transmission between electronic devices.

"SIGNAL" as used herein refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 904 (sometimes referred to as "cores") that may execute instructions 910 contemporaneously.

What is claimed is:

1. An apparatus, comprising:
a first transceiver configured to establish a first wireless link with a data source for receiving a plurality of data packets, and to establish a second wireless link with a second transceiver for transmitting a set of parameters to the second transceiver to enable the second transceiver to sniff the plurality of data packets from the data source;
the first transceiver is further configured to send a second acknowledgment to the data source via the first wireless link upon failure to receive the plurality of data packets from the data source via the first wireless link and upon receiving a first acknowledgment from the second wireless transceiver via the second wireless link, the second acknowledgment acknowledging receipt of the plurality of data packets from the data source.

2. The apparatus of claim 1, wherein the first transceiver is configured to receive the plurality of data packets from the second transceiver via the second wireless link after the first transceiver transmits the second acknowledgment to the data source.

3. The apparatus of claim 1, wherein the first and second transceivers are configured to respectively extract a first audio channel and a second audio channel from the plurality of data packets.

4. The apparatus of claim 1, wherein the set of parameters comprises device address, frequency information, communication band information, native clock information, logical transport address, clock offset information and link key information.

5. The apparatus of claim 1, wherein the second wireless link is implemented as a combination of a first Bluetooth piconet and a proprietary wireless communication link.

6. The apparatus of claim 1, wherein the second wireless link is implemented as the proprietary wireless communication link.

7. The apparatus of claim 1, wherein the first acknowledgment is transmitted during an idle period before the start of a next time slot.

8. A system, comprising:
a first transceiver and a second transceiver, the first transceiver configured to establish a first wireless link with a data source for receiving a plurality of data packets, and to establish a second wireless link with the second transceiver for transmitting a set of parameters to the second transceiver to enable the second transceiver to detect the plurality of data packets from the data source;
the first transceiver is further configured to send a second acknowledgment to the data source via the first wireless link upon failure to receive the plurality of data packets from the data source via the first wireless link and upon receiving a first acknowledgment from the second wireless transceiver via the second wireless link, the second acknowledgment acknowledging receipt of the plurality of data packets from the data source;

the second transceiver is configured to receive the set of parameters from the first transceiver via the second wireless link, and sniff the plurality of data packets from the data source; and the second transceiver is further configured to send the first acknowledgment to the first transceiver via the second wireless link upon obtaining the plurality of data packets from the data source via the enabled wireless link.

9. The system of claim 8, wherein the second transceiver is configured to send the plurality of data packets to the first transceiver via the second wireless link after the first transceiver sends the second acknowledgment to the data source.

10. The system of claim 8, wherein the first and second transceivers are configured to respectively extract a first audio channel and a second audio channel from the plurality of data packets.

11. The system of claim 8, wherein the second wireless link is implemented as a combination of a first Bluetooth piconet and a proprietary wireless communication link.

12. The system of claim 8, wherein the first acknowledgment is transmitted during an idle period before the start of a next time slot.

13. A method, comprising:

establishing a first wireless link with a data source, by a first transceiver, for receiving a plurality of data packets;

establishing a second wireless link with a second transceiver, by the first transceiver, for transmitting a set of parameters to the second transceiver to enable the second transceiver to sniff the plurality of data packets from the data source; and sending a second acknowledgment to the data source via the first wireless link upon failure to receive the plurality of data packets from the data source via the first wireless link and upon receiving a first acknowledgment from the second wireless transceiver via the second wireless link, the second acknowledgment acknowledging receipt of the plurality of data packets from the data source.

14. The method of claim 13, further comprising:

receiving the plurality of data packets, by the first transceiver, from the second transceiver via the second wireless link.

15. The method of claim 13, wherein the first transceiver receives the plurality of data packets from the second transceiver after the first transceiver receives the first acknowledgment from the second transceiver.

16. The method of claim 13, wherein the first and second transceivers are configured to respectively extract a first audio channel and a second audio channel from the plurality of data packets.

17. The method of claim 13, wherein the method supports scatternet operation.

18. The method of claim 13, wherein the set of parameters comprises device address, frequency information, communication band information, native clock information, logical transport address, clock offset information and link key information.

19. The method of claim 13, wherein the second wireless link is implemented as a combination of a Bluetooth piconet and a proprietary wireless communication link.

20. The method of claim 13, wherein the second wireless link is implemented as the proprietary wireless communication link.

* * * * *